United States Patent
Lakowicz et al.

(10) Patent No.: US 8,027,039 B2
(45) Date of Patent: Sep. 27, 2011

(54) SUBWAVELENGTH RESOLUTION OPTICAL MICROSCOPY

(75) Inventors: Joseph R. Lakowicz, Ellicott City, MD (US); Mustafa Habib Chowdhury, Washington, DC (US); Chandran R. Sabanayagam, Abingdon, MD (US)

(73) Assignee: University of Maryland, Baltimore, Baltimore, MD (US)

( * ) Notice: Subject to any disclaimer, the term of this patent is extended or adjusted under 35 U.S.C. 154(b) by 0 days.

(21) Appl. No.: 12/082,824

(22) Filed: Apr. 15, 2008

(65) Prior Publication Data

US 2008/0252894 A1  Oct. 16, 2008

Related U.S. Application Data

(60) Provisional application No. 60/923,577, filed on Apr. 16, 2007.

(51) Int. Cl.
*G01N 21/55* (2006.01)
*G01B 11/14* (2006.01)

(52) U.S. Cl. ..... 356/445; 356/625; 356/635; 250/237 R; 250/216; 250/341.1

(58) Field of Classification Search .......... 356/600–625, 356/628–630, 634–636, 445; 250/341.1, 250/368, 370.08; 430/2, 320, 321
See application file for complete search history.

(56) References Cited

U.S. PATENT DOCUMENTS

| | | | | |
|---|---|---|---|---|
| 5,539,446 A | * | 7/1996 | Sullivan | 347/262 |
| 5,886,532 A | * | 3/1999 | Hsu et al. | 324/635 |
| 5,982,483 A | * | 11/1999 | Lauinger et al. | 356/239.2 |
| 6,180,288 B1 | * | 1/2001 | Everhart et al. | 430/2 |
| 6,288,392 B1 | * | 9/2001 | Abbott et al. | 850/33 |
| 6,633,392 B1 | * | 10/2003 | Singh et al. | 356/630 |
| 6,643,012 B2 | * | 11/2003 | Shen et al. | 356/301 |
| 6,649,901 B2 | * | 11/2003 | Thio et al. | 250/216 |
| 6,758,612 B1 | * | 7/2004 | Tabery et al. | 396/569 |
| 6,817,528 B2 | * | 11/2004 | Chen | 235/462.13 |
| 6,906,315 B2 | * | 6/2005 | Tobiason | 250/237 R |
| 7,027,163 B2 | * | 4/2006 | Angeley | 356/521 |
| 7,088,449 B1 | * | 8/2006 | Brongersma | 356/445 |
| 7,180,979 B2 | * | 2/2007 | Momose | 378/62 |
| 7,476,787 B2 | * | 1/2009 | Thomas et al. | 250/306 |
| 2005/0285128 A1 | * | 12/2005 | Scherer et al. | 257/98 |

* cited by examiner

*Primary Examiner* — Sang Nguyen
(74) *Attorney, Agent, or Firm* — Benjamin Aaron Adler

(57) ABSTRACT

Provided herein are methods for imaging subwavelength structures in three dimensions and with high resolution. The methods comprise illuminating subwavelength structures with an illuminating wavelength of light and detecting the self-image generated thereby at a distance distal to the structures. Also provided is a method for confining propagating light to a sub-diffraction limit dimension by illuminating a surface of a metal structure with subwavelength features with a wavelength of coherent light such that light propagating from the features is confined to a dimension that is a sub-diffraction limit thereof.

19 Claims, 3 Drawing Sheets

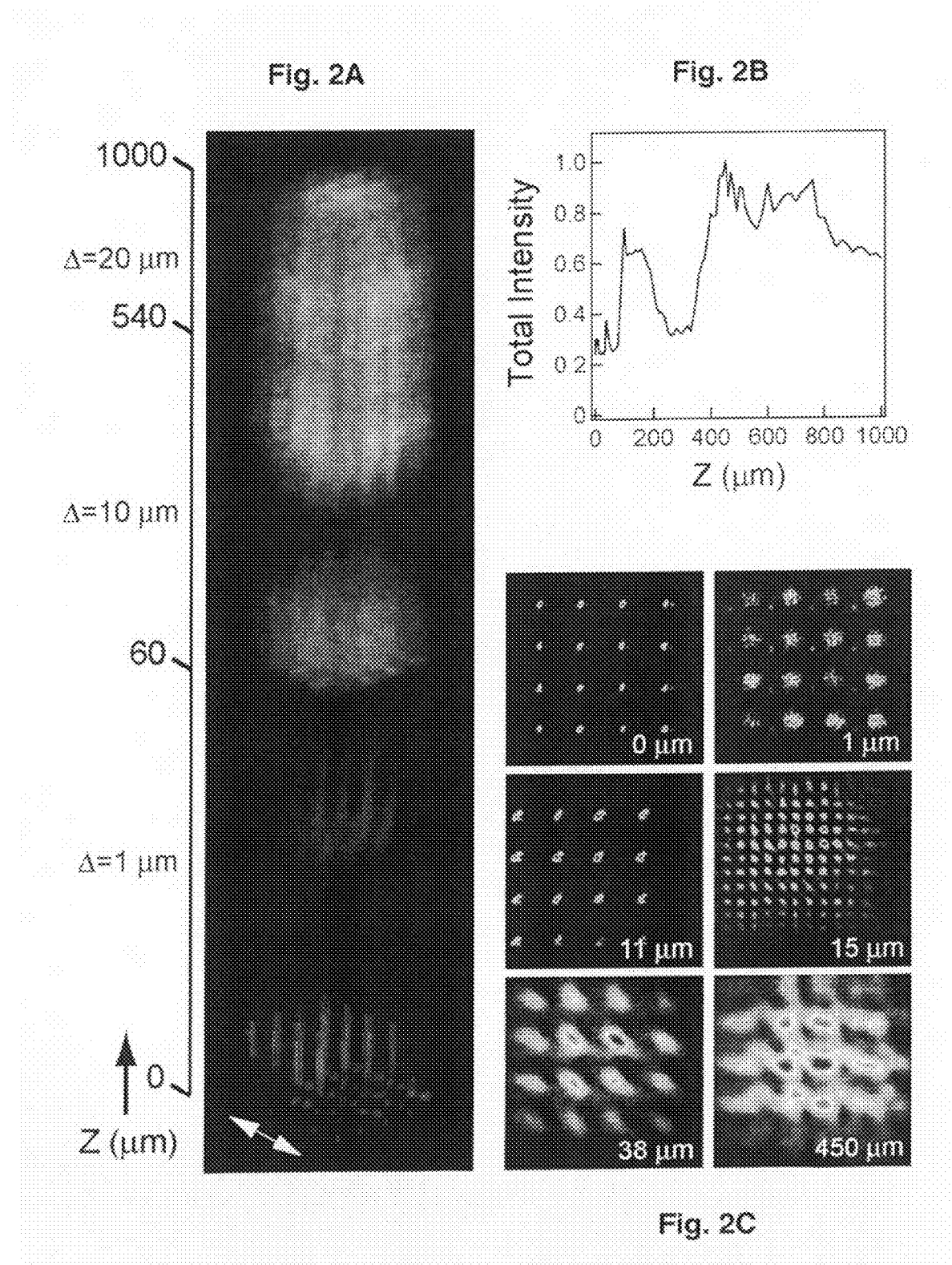

SUBWAVELENGTH RESOLUTION OPTICAL MICROSCOPY

CROSS-REFERENCE TO RELATED APPLICATIONS

This nonprovisional application claims benefit of priority under 35 U.S.C. §119(e) of provisional U.S. Ser. No. 60/923,577, filed Apr. 16, 2007, now abandoned.

FEDERAL FUNDING LEGEND

This work was supported by grants from the National Institutes of Health (RR-08119, EB-006521 and HG-002655). The U.S. Government has certain rights in this invention.

BACKGROUND OF THE INVENTION

1. Field of the Invention

The present invention relates to the fields of optical and/or fluorescence microscopy, scanning probe microscopy, photolithography, and semiconductor manufacturing and quality control. Specifically, the present invention provides methods for detecting and imaging subwavelength size structures.

2. Description of the Related Art

The interaction of light with nano-apertures in metallic films produces interesting effects that resemble the properties of traditional optical elements, such as chromatic filters (1-11) and lenses (12-14). The optical characteristics of these perforated films are not completely understood and appear to be created by the interference of the transmitted light with surface modes, plasmon polaritrons and/or diffracted evanescent waves (1-11, 15). Experimental methods used for imaging the transmittivity of subwavelength apertures utilize near-field scanning optical microscopy (NSOM). NSOM has been used to characterize the optical properties of a variety of apertures: nanoholes (16), arrays of nanoholes (17), nanoslits (12,18), and apertures surrounded by periodic corrugations (12). However, unlike the surface near-fields, the 3D far-field light distribution is far more difficult to determine experimentally and hence there is little data available to confirm theoretical predictions.

One experimental profiling technique has been used to map the far-field light distribution emanating from an illuminated nanoslit (19). This technique currently has a spatial resolution of 5 μm and is restricted to 2D beam profiling. Another way to understand light interactions with nano-apertures is through numerical simulations of Maxwell's equations, such as the finite-difference time-domain (FDTD) method (13,14,16-18, 20). The FDTD calculated near-fields surrounding the apertures are in impressive agreement with experimental observations (16-18). But, direct numerical calculations of the 3D far-field light distributions are seldom performed because of the enormous amount of computational resources required.

Optical microscopy, both transmission and fluorescence, has limited spatial resolution due to well-known limits of diffraction. Few methods are available to increase resolution. For example, electron microscopy increases resolution, but requires samples be treated and that samples are non-living. Furthermore, approaches to increase optical resolution are complex and expensive, for example, the use of stimulated emission depletion (STED) microscopy, which uses multiple lasers.

Pendry described a lens based on negative refraction materials (21). However, such materials do not exist in the optical region. Furthermore, even if such materials are created the images exist only in the near-field above the metal, approximately 50 nm (22). The imaging methods presented herein also are distinct from the Talbot-effect because the known effect does not result in subwavelength features (23).

Thus, there is a recognized need in the art for methods of high resolution optical mapping of structures with sub-optical wavelength dimension that do not require contact or near-field measurement. More specifically, the prior art is deficient in methods of imaging subwavelength structures via mapping the three dimensional spatial distribution of light transmitted through a structure of interest at far-field distances from the surface. The present invention fulfills this long-standing need and desire in the art.

SUMMARY OF THE INVENTION

The present invention is directed to a method for three-dimensional imaging of subwavelength structures with high resolution. The method comprises illuminating a metal structure having features with dimensions that are a subwavelength of an illuminating incident light wavelength to generate a self-image thereof and detecting the self-image at a distance distal to the metal structure thereby producing a three-dimensional high resolution image.

The present invention also is directed to a method for imaging an object of interest. The method comprises applying the object of interest to a metal structure, where the object has dimensions that are a subwavelength of a wavelength of incident illuminating light, and illuminating the metal structure with the incident light to generate a self-image thereof. The self-image is detected at a distance distal to the metal structure thereby imaging the object of interest. Such images may be obtained by movement of the illuminated regions in the object of interest.

The present invention is directed further to a method for confining propagating light to a sub-diffraction limit dimension. The method comprises illuminating a surface of a metal structure with a wavelength of coherent light, where the metal structure has periodic features of subwavelength dimensions thereon. Light propagating from the subwavelength features is confined to a dimension that is a sub-diffraction limit thereof.

The foregoing has outlined rather broadly the features and technical advantages of the present invention in order that the detailed description of the invention that follows may be better understood. Additional features and advantages of the invention will be described herein, which form the subject of the claims of the invention. It should be appreciated by those skilled in the art that any conception and specific embodiment disclosed herein may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that any description, figure, example, etc. is provided for the purpose of illustration and description only and is by no means intended to define the limits the invention.

BRIEF DESCRIPTION OF THE DRAWINGS

FIG. 1A is a scanning electron micrograph of a 4×4 nanohole array. FIG. 1B is a schematic of the near-field scanning optical microscopy (NSOM) setup used for optical mapping of the light fields.

FIGS. 2A-2C depict the transmission intensity along the optical Z-axis from the 4×4 nanohole array. FIG. 2A shows the false color 3D intensity distribution of light transmitted through the 4×4 nanohole array. Scan resolution in the XY-plane is 50 nm over the 10×10 mm² area. For optical sectioning, the Z height position of the NSOM tip was incremented by DZ=1 mm from 0 to 60 mm, DZ=10 mm from 70 to 540 mm, and DZ=20 mm from 560 to 1000 mm. The incident light polarization is along the X-axis (white double arrow). FIG. 2B shows the XY-plane images at selected Z heights, as indicated in the lower right of each plot. The XY images are normalized by their minimum and maximum values for clarity. FIG. 2C shows the total light intensity for each image plane as a function of the NSOM tip distance from the surface. The intensity is normalized by the peak value at 450 mm.

FIG. 3A shows the projection of the 3D light intensity distribution along the XZ-plane. The NSOM tip distance, Z (mm), from the surface is given on the right of the image. Each area scan is separated by DZ=1 mm, except for the second scan which was taken at Z=500 nm above the surface, and the third scan which was at Z=1 mm. FIG. 3B shows the line intensity profiles obtained from the XZ image at several Z positions shown in FIG. 3A and as given in the upper right of the plots. The intensity profiles are normalized by their maxima.

DETAILED DESCRIPTION OF THE INVENTION

I. Definitions

Figure 1A:
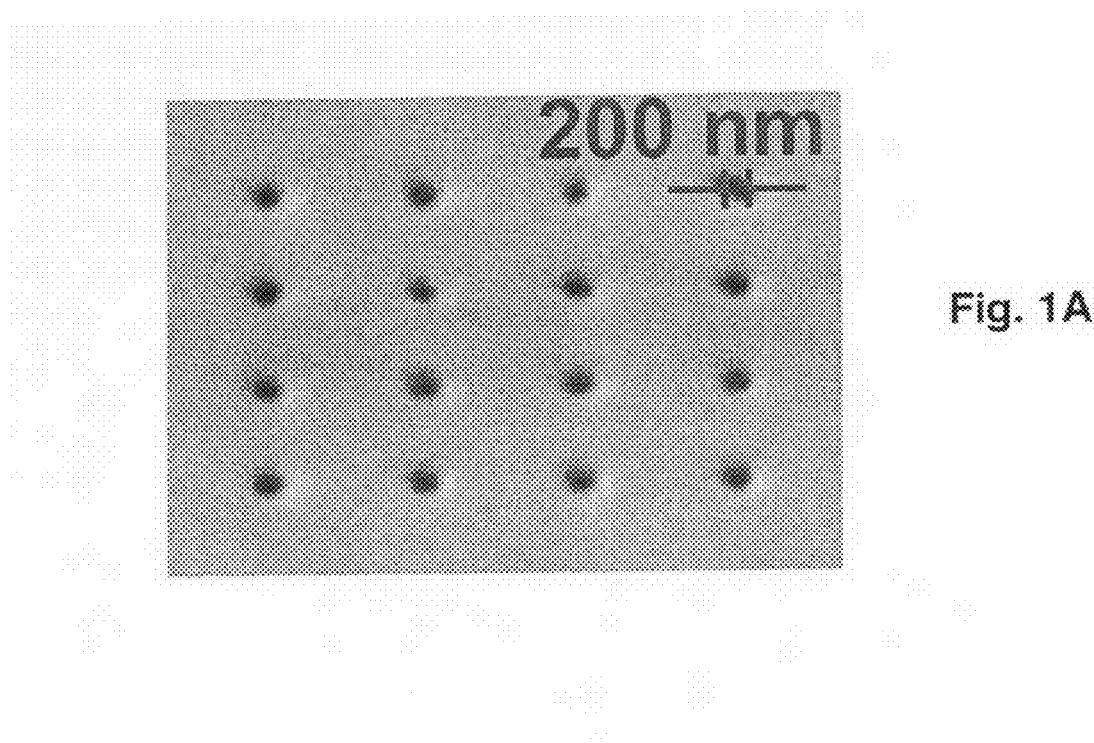
FIGS. 1A-1B depict the setup for near-field scanning optical microscopy.

As used herein the specification, "a" or "an" may mean one or more. As used herein in the claim(s), when used in conjunction with the word "comprising", the words "a" or "an" may mean one or more than one. As used herein "another" may mean at least a second or more. Furthermore, unless otherwise required by context, singular terms shall include pluralities and plural terms shall include the singular.

As used herein, the term "or" in the claims is used to mean "and/or" unless explicitly indicated to refer to alternatives only or the alternatives are mutually exclusive, although the disclosure supports a definition that refers to only alternatives and "and/or."

As used herein, "about" refers to numeric values, including whole numbers, fractions, percentages, etc., whether or not explicitly indicated. The term "about" generally refers to a range of numerical values, e.g., +/−5-10% of the recited value, that one would consider equivalent to the recited value, e.g., having the same function or result. In some instances, the term "about" may include numerical values that are rounded to the nearest significant figure.

As used herein, "alloy" refers to a solid or liquid mixture of a metal with one or more additional materials, said additional materials include, for example, a non-metal, such as carbon, etc., a periodic metal, such as gold, silver, aluminum, cooper, nickel, tungsten, platinum, palladium, chromium, etc., or an alloy, such as brass, bronze, stainless steel, duralium, solder, etc., which alters, enhances, or improves the properties of the metal.

As used herein, "sub-diffraction limited" or "sub-diffraction limit" generally refers to a wavelength that is less than the wavelength of the incident light.

II. Present Invention

In one embodiment of the present invention there is provided a method for three-dimensional imaging of subwavelength structures with high resolution, comprising illuminating a metal structure having features with dimensions that are a subwavelength of an illuminating incident light wavelength to generate a self-image thereof; and detecting the self-image at a distance distal to the metal structure thereby producing a three-dimensional high resolution image.

In this embodiment the illuminating step may comprise transmitting the incident light from a far-field source. Also, the self-image may comprise subwavelength size optical spots or transmitted light having an intensity modulation along a propagation axis or in planes above the structure. In addition, the distance distal to the metal structure may be about 1 nanometer to about 1000 microns. Particularly, the distal distance may be about 1 nm to about 500 nm, about 500 nm to 1000 microns, about 1 micron to about 1000 microns, or about 450 microns to about 1000 microns.

In this embodiment the metal structure may have periodic subwavelength sized features or, alternatively, may have periodic features greater than subwavelength size. Also, the metal structure may be a metal film. In addition, the metal structure may be gold, silver, aluminum, cooper, nickel, tungsten, platinum, palladium, or chromium or a metal alloy.

In another embodiment of the present invention there is provided a method for imaging an object of interest comprising: applying the object of interest to a metal structure, said object having dimensions that are a subwavelength of a wavelength of incident illuminating light; illuminating the metal structure with the incident light to generate a self-image thereof; and detecting the self-image at a distance distal to the metal structure thereby imaging the object of interest.

In this embodiment the illuminating step may be as described supra and the step of detecting the self-image may comprise scanning across the object of interest for optical spots that comprise the self-image. Also, the object of interest may be an organelle, cell, tissue, organism, nucleic acid, protein, antibody, lipid, integrated circuit, or semiconductor wafer. In addition, the metal structure may comprise subwavelength features which may be periodic features. Furthermore, in this embodiment the illuminating step, the self-image, the type of metal structure and metal comprising the same, and the distance distal to the metal structure are as described supra.

In yet another embodiment of the present invention there is provided a method for confining propagating light to a sub-diffraction limit dimension, comprising illuminating a surface of a metal structure with a wavelength of coherent light, where the metal structure has periodic features of subwavelength dimensions thereon; where light propagating from the subwavelength features is confined to a dimension that is a sub-diffraction limit thereof.

In this embodiment the illuminating step may comprise transmitting the coherent light from a far-field source. The distance to the far-field source may be greater than 1000 microns. The type of metal structure and the metal comprising the same is as described supra.

Provided herein are methods of far-field imaging or microscopy that differ from the art in that the described methods utilize a metal structure with subwavelength size features. Illumination of the metal structure results in self-imaging of the structure at a location distant therefrom. The images may be that of the metal structure or a transform image thereof which can be processed to yield a true self-image. The self-images comprise subwavelength size optical spots or transmitted light having an intensity modulation along a propagation axis or in planes above the structure. Either are useful in transmission and fluorescence microscopy or spectroscopy or other related applications known in the art.

The metal structure may be a metal film having periodic structures or features, such as an array of subwavelength features, for example, but not limited to, nanoholes or nanoslits or a grating. Alternatively, the features may be longer than subwavelength. The metal film may be deposited or adsorbed onto a substrate such as glass or silica or other silicon material and the periodic structures or features may be introduced thereon by, for example, milling or ion beam milling, all as are known in the art. The metal may be gold, silver, aluminum, cooper, nickel, tungsten, platinum, palladium, chromium or a metal alloy.

More particularly, NSOM, as is known and standard in the art, may be utilized to show the subwavelength features on structures by mapping the 3D spatial intensity distribution of light transmitted through a metal at distances from the metal surface to 1000 microns or greater above the surface. The map of the intensity distribution of light at various distances can be used to image the structure or object of interest as a self-image. The self-image may be detected by scanning for the optical spots across the object of interest. Distances may be near-field or a more distal far-field. Preferable distances are about 1 nm to about 500 nm, about 500 nm to 1000 microns, about 1 micron to about 1000 microns or about 450 microns to about 1000 microns.

The metal structure may be illuminated with incident light, as is known and standard in the art, for example, laser light. The incident light source is at a distance greater than 1000 microns from the structure. An incident wavelength is greater than the dimensions of the features comprising the metal or of a structure of interest, organic and/or inorganic, disposed thereon. Propagating light may be confined to dimensions that are less than the incident wavelength, particularly less than the diffraction limit of the subwavelength features. The self-image may be detected by any suitable photodetector.

The present methods provide for imaging at a distance from the metal film and throughout a subwavelength structure of interest disposed thereon. Imagable subwavelength structures may be organic, such as and without being limiting, an organelle, a single cell, a tissue, an organism, a nucleic acid, a protein, an antibody, or a lipid. Alternatively, the subwavelength structure may be an integrated circuit or a semiconductor wafer.

Also, illuminating a metal structure having periodic subwavelength features, such as, but not limited to, a grating, results in the confinement of light propagating from the illuminated features to sub-diffraction limit dimensions. Without being limited by theory, the light propagating along the optical axis to the far-field is confined to sub-diffraction limit dimensions by a combination of constructive and destructive interference and surface plasmon resonance effects.

The following examples are given for the purpose of illustrating various embodiments of the invention and are not meant to limit the present invention in any fashion.

Example 1

Setup Using a Metal Nanohole Array

Light fields transmitted through a 4×4 nanohole array in a silver film supported by a glass substrate were investigated (FIG. 1A). Nanoholes were made by focused ion beam milling into a 200 nm thick silver film thermally deposited onto a 170 mm thick glass coverslip. The average hole diameter is 200 nm, with 2060 nm center-to-center spacing.

Figure 1B:
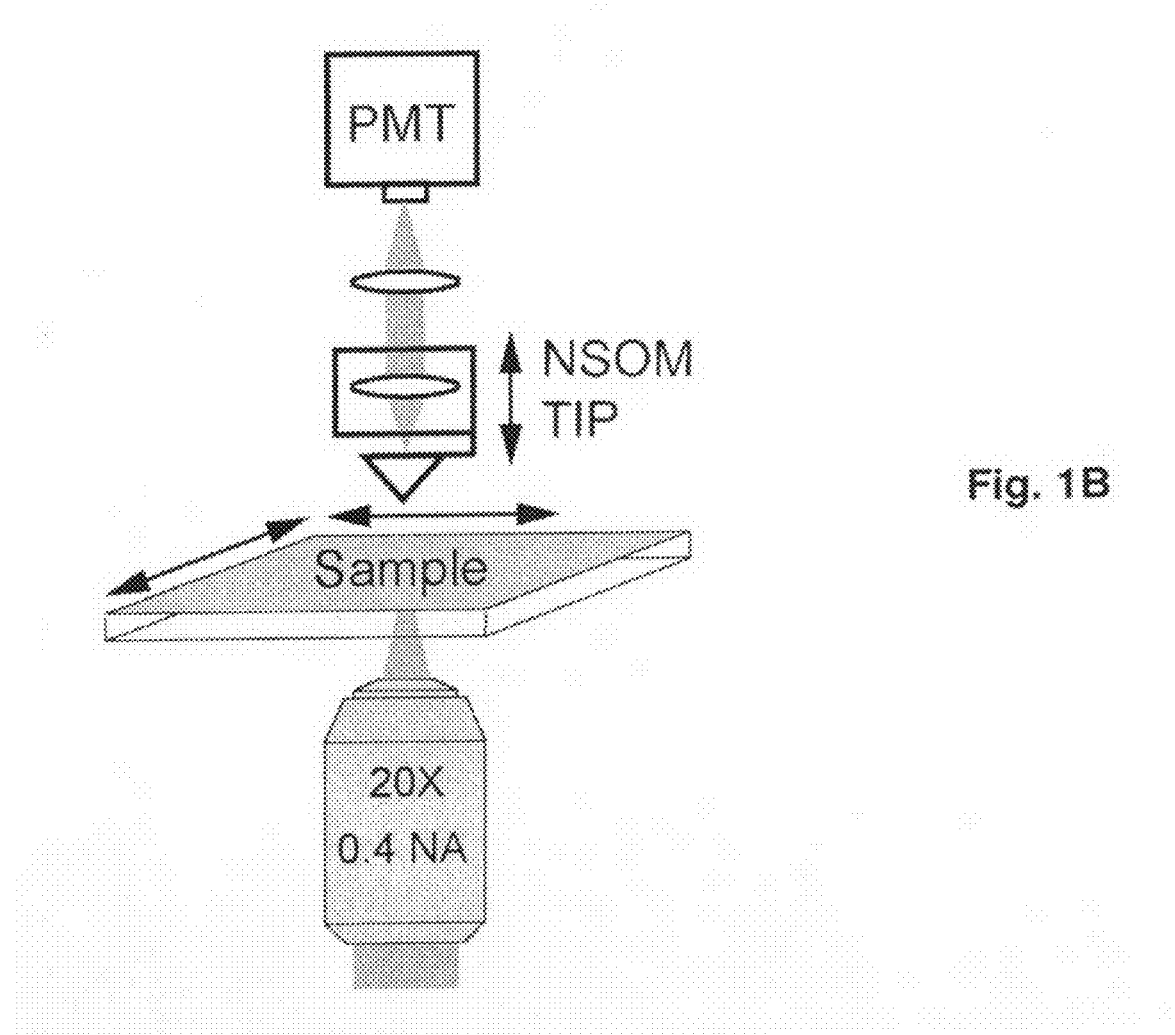

The array is illuminated with 514.5 nm laser light and imaging is performed with an NSOM (WiTec a-300S, GmbH) in collection mode (FIG. 1B). The NSOM is used to obtain the light field distribution above the array in a manner similar to optical sectioning microscopy. The typical aperture size of NSOM probes is less than about 100 nm in diameter, thereby offering greater lateral (X-Y) resolution compared to conventional light microscopy. Also, the optical "depth of focus" for an NSOM tip is approximately 100-200 nm. Thus, optical sectioning using an NSOM tip affords superior axial resolution, compared to 1-2 μm obtained by confocal microscopy.

A long working distance (3.8 mm), low-numerical aperture objective is used to focus the 514.5 nm line of an Ar$^+$ laser onto the upper silvered sample surface and aligned to the NSOM aperture. Imaging is performed by raster scanning the sample, with the objective and NSOM tip held at a fixed position, initially at the surface. Light collected by the NSOM tip is focused onto a photomultiplier tube (PMT) detector. The NSOM tip height is varied above the surface up to 1000 μm and the same area is imaged to obtain the 3D light intensity distribution.

Example 2

Three Dimensional Transmission Intensity

As shown in FIG. 2A, the 3D light intensity distribution is very complex and exhibits many features. As an unexpected finding, it is noted that the intensity does not decay sharply as one skilled in the art may initially expect, but actually propagates along the optical axis well into the far-field. Also, the propagating field does not decay monotonically, but is modulated in a striking manner (FIG. 2B). From a broad viewpoint, the intensity distribution consists of three minima and four maxima. The maximum light intensity does not occur near the surface apertures but at the image plane 450 μm away, which shows a total intensity approximately four times of that at the surface. The intensity minima are unusual, and demonstrate that these nanohole arrays can cause the propagating light to destructively interfere creating "dark zones" that can extend as much as 30 μm along the propagation axis (FIGS. 2A and 3A, 20-30 μm). It is contemplated that this extended dark zone may have been undetectable during previous examinations of the light fields at significant distances from the surface.

Another feature of the light intensity distribution volume is that it appears to have beaming characteristics, i.e, it does not diverge outside of the array boundary, although within the array boundary the 16 individual nanoholes appear smeared at distances greater than 60 μm from the surface (FIG. 2C). Beaming of light has also been observed for single nanohole apertures that are surrounded by concentric, corrugated rings (12) and nanoslits flanked by periodic nanostructures (12-14). In these geometries, the interference of the surface plasmon modes with the transmitted light acts like a lens to focus the light. However, there is a lack of both experimental and theoretical investigations of the light field distribution at large distances (>100 μm) from the surface. At distances below 60 μm from the surface, the 16 nanoholes are easily resolvable for at least four different revival image planes (FIG. 2C). At other image planes such as Z=15 μm, the image unexpectedly displays higher periodicity than the surface image.

Example 3

3D Intensity Volume Projection

Figures 3A, 3B:
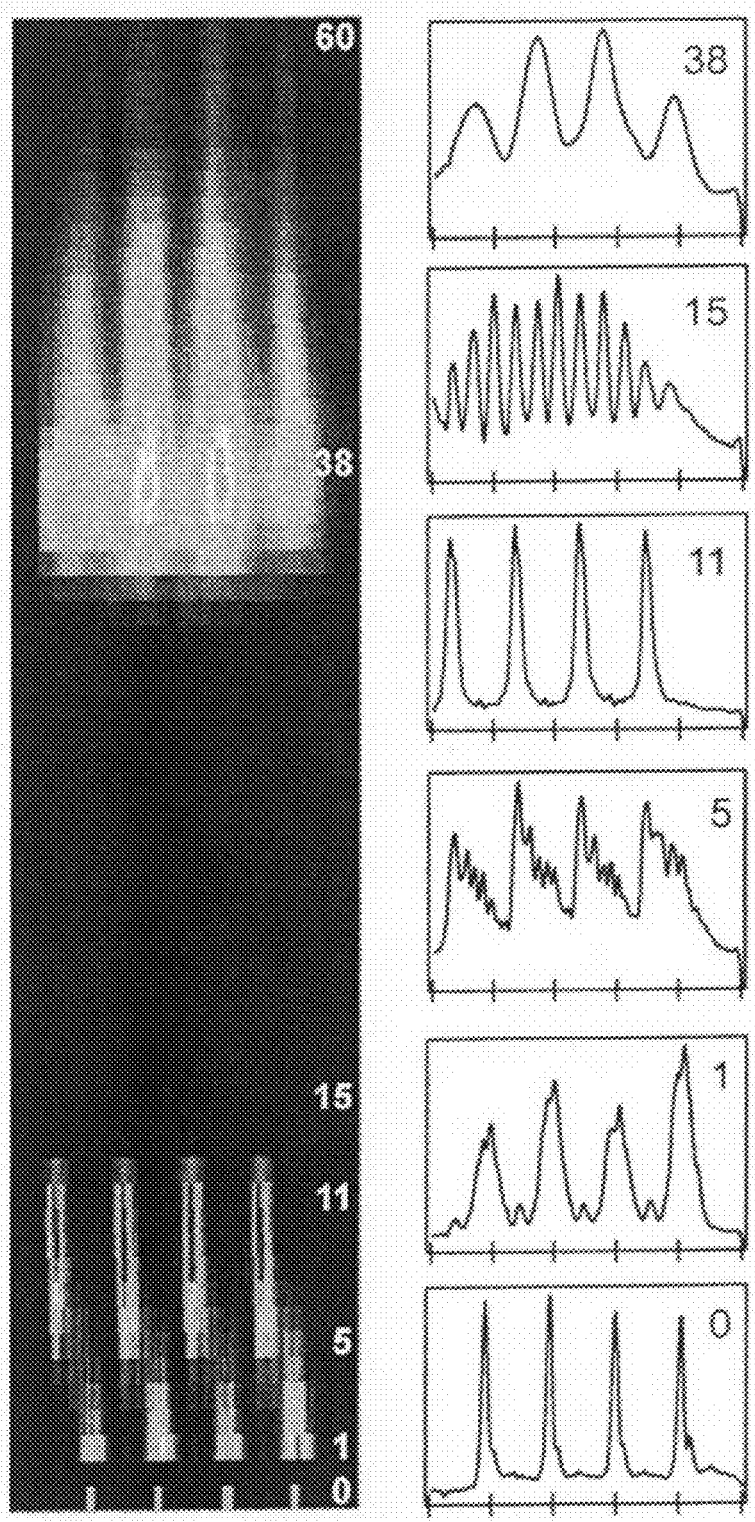
FIGS. 3A-3B depict the light intensity distribution from the 4×4 nanohole array.

For clarity, FIG. 3A displays a projection of the 3D intensity volume onto the XZ plane, which is produced by summing the pixel values along the Y-axis. The revival images are similar to the optical Talbot self-imaging effect (24-25). This phenomenon can be observed with periodic structures, e.g., gratings, illuminated with coherent light. With an ideal (infinite) periodic grating, revival images of the structure reappear at the so-called Talbot distances, $Z_T(n)=n2d^2/\lambda$, where n is an integer, d is the periodicity of the structure and $\lambda$ is the illumination wavelength.

Significant variation in the intensity distribution both transversely and along the direction of propagation has been observed at distances located in between Talbot planes for coherent array beams from carbon dioxide waveguide lasers, which has been attributed to destructive and constructive interferences of the coherent array emission (20). Very recently the plasmon Talbot effect has been reported on metallic substrates that leads to focusing of light along the propagation axis (z axis) by quasiperiodic arrays and to the in-plane, i.e., along the y axis, focusing of light by linear nanohole arrays (24-25).

For the nanohole array of FIG. 1A, d=2060 nm=4$\lambda$, and the first Talbot image plane is expected to occur at $Z_T(1)=32\lambda=16.5$ µm with 514.5 nm light. Additional images of the nanohole array should also reappear at integer multiples of the Talbot distances: 33.0 µm, 49.4 µm, 65.9 µm, etc. As can be seen from FIG. 3A, this trend was not observed with our nanohole array. Specifically, the nanohole array produced "image-like" revivals at Z planes: 1 µm, 11 µm and 38 µm (FIG. 2C and FIG. 3A). However, a strong Talbot effect would not be expected for a 4×4 hole array because it not an ideal periodic structure. Furthermore, the subwavelength dimensions of the apertures and the interference between the surface plasmon modes (localized and polaritrons) with the transmitted light can significantly alter the free-space diffraction that produces Talbot self-imaging. Nonetheless, it is noted that the silver nanohole array can produce a self-imaging phenomenon with "Talbot-like" characteristics. It is contemplated that it is the complex interplay of the destructive and constructive interferences of the coherent array emission combined with the plasmonic nature of the interaction of the silver nanohole array with the incident laser that causes the results shown in FIGS. 2A-2C and 3A-3B.

The nanohole array also displays a fractional Talbot-like effect (18-26). Images with an increase in periodicity of the original structure occur at fractional Talbot planes $Z_T/2m$, where m is an integer that reflects the periodicity. For odd values of m, the revival images are shifted by ½ periods relative to the original structure. Fractional image revivals were observed with our nanohole array at Z=11 µm, which shows a periodicity of m=1 (shifted by ½ period), and at Z=15 µm the image displays a periodicity of m=2 (FIGS. 2B and 3B). Higher order periodicities may also be present.

The fractional image plane at Z=11 µm shows very unique optical features. Particularly interesting are the subwavelength dimensions of the light propagating from each nanohole, comparable to the diameter of the apertures. For comparison, line intensity profiles along the X-axis at key image planes are provided in FIG. 3B. At the surface, the line profiles of the nanoholes yield a full-width half-maximum (FWHM) value of 124±5 nm and at 11 µm the FWHM=213±9 nm where the light intensity at this plane is about twice that at the surface. The propagating light is very well registered and similar in intensity from 8-11 µm, indicating low divergence. It is contemplated that this feature would be useful in the development of an optical microscope with subwavelength resolution, similar to an NSOM, but without the restriction of the illumination source being in contact with the sample because the light propagates into the far-field. The parameters that define the propagating light fields are being deduced.

The following references are cited herein.
1. Ebesen et al., Nature 391:667-669 (1998).
2. Degiron et al., Appl. Phys. Lett. 81:43274329 (2002).
3. Barbara et al., Phys. Rev. B 66, 161403 (2002).
4. Koerkamp et al., *Phys. Rev. Lett.* 92:183901 (2004).
5. Degiron, A. and Ebbesen, T. W. *Opt. Express* 12:3694-3700 (2004).
6. Prikulis et al., Nano Lett. 4:1003-1007 (2004).
7. Gordon et al., Phys. Rev. Lett. 92:037401 (2004).
8. Degiron, A. and Ebbesen, T. W., J. Opt. Pure Appl. Opt. 7:S90-S96 (2005).
9. Lalanne et al., J. Opt. Pure Appl. Opt. 7:422-426 (2005).
10. DiMaio, J. R. and Ballato, J. Opt. Express 14:2380-2384 (2006).
11. Lezec, H. J. and Thio, T., Opt. Express 12:3629-3651 (2004).
12. Lezec et al., Science 297:820-822 (2002).
13. Wang, B. and Wang, G. P., Appl. Phys. Lett. 88:013114 (2006).
14. Lin, et al., Opt. Express 8:3503-3511 (2006).
15. C. Genet, T. W. Ebbesen, Nature 455:39-46 (2007).
16. Yin, et al., Appl. Phys. Lett. 85:467-469 (2004).
17. Hohng et al., Appl. Phys. Lett. 81:3239-3241 (2002).
18. E. Noponen, E. and Turunen, J., Opt. Comm. 98:132-140 (1993).
19. Guérineau et al., Opt. Express 11:3310-3319 (2003).
20. Baker et al., IEEE J. Quantum Electron 32:400 (1996).
21. Pendry et al., Phys Rev Lett. 85(18):3966-3969 (Oct. 30, 2000).
22. Docter et al., Proc. SPIE Vol. 5703:118-126 (2005).
23. Willig et al., Nature 440:935-939 (2005).
24. Dennis et al., Opt. Express 15:9692 (2007).
25. Huang et al., Appl. Phys. Lett. 90:091119 (2007).
26. Leger, J. R. and Swanson, G. J., Opt. Lett 1:288 (1990).

Any patents or publications mentioned in this specification are indicative of the level of those skilled in the art to which the invention pertains. Further, these patents and publications are incorporated by reference herein to the same extent as if each individual publication was specifically and individually incorporated by reference.

One skilled in the art would appreciate readily that the present invention is well adapted to carry out the objects and obtain the ends and advantages mentioned, as well as those objects, ends and advantages inherent herein. Changes therein and other uses which are encompassed within the spirit of the invention as defined by the scope of the claims will occur to those skilled in the art.

What is claimed is:

1. A method for three-dimensional imaging of subwavelength structures with high resolution, comprising:
   illuminating a metal structure having features with dimensions that are a subwavelength of an illuminating incident light wavelength to generate a self-image thereof; and
   detecting the Talbot self-image with a photodetector at a distance distal to the metal structure thereby producing a three-dimensional high resolution image; wherein the subwavelength features on the structures by a mapping spatial intensity distribution of light transmitted through the metal structures at distances from the metal surface and the self-image is the map of the intensity distribution of the light at various distances to be imaged from the metal structures.

2. The method of claim 1, wherein the illuminating step comprises transmitting the incident light from a far-field source.

3. The method of claim 1, wherein the metal structure has periodic subwavelength sized features or periodic features greater than subwavelength size.

4. The method of claim 1, wherein the metal structure is a metal film.

5. The method of claim 1, wherein the metal structure is gold, silver, aluminum, cooper, nickel, tungsten, platinum, palladium, or chromium or a metal alloy.

6. The method of claim 1, wherein the distance distal to the metal structure is about 1 nanometer to about 1000 microns.

7. The method of claim 6, wherein the distance distal to the metal structure about 1 nm to about 500 nm, about 500 nm to 1000 microns, about 1 micron to about 1000 microns, or about 450 microns to about 1000 microns.

8. The method of claim 1, wherein the self-image comprises subwavelength size optical spots or transmitted light having an intensity modulation along a propagation axis or in planes above the structure.

9. A method for imaging an object of interest comprising:
    applying the object of interest to a metal structure, said object having dimensions that are a subwavelength of a wavelength of incident illuminating light;
    illuminating the metal structure with the incident light to generate a self-image thereof; and
    detecting the Talbot self-image with a photodetector at a distance distal to the metal structure thereby imaging the object of interest; wherein the subwavelength features on the structures by a mapping spatial intensity distribution of light transmitted through the metal structures at distances from the metal surface and the self-image is the map of the intensity distribution of the light at various distances to be imaged form the metal structures.

10. The method of claim 9, wherein the illuminating step comprises transmitting the incident light from a far-field source.

11. The method of claim 9, wherein the detecting step comprises scanning the object of interest for optical spots that comprise the self-image.

12. The method of claim 9, wherein the object of interest is an organelle, cell, tissue, organism, nucleic acid, protein, antibody, lipid, integrated circuit, or semiconductor wafer.

13. The method of claim 9, wherein the metal structure comprises subwavelength features.

14. The method of claim 9, wherein the metal structure has periodic features.

15. The method of claim 9, wherein the metal structure is a film.

16. The method of claim 9, wherein the metal structure is gold, silver, aluminum, cooper, nickel, tungsten, platinum, palladium, or chromium, or is a metal alloy.

17. The method of claim 9, wherein the distance distal to the metal structure is about 1 nanometer to about 1000 microns.

18. The method of claim 17, wherein the distance distal to the metal structure is about 1 nm to about 500 nm, about 500 nm to 1000 microns, about 1 micron to about 1000 microns, or about 450 microns to about 1000 microns.

19. The method of claim 9, wherein the self-image comprises subwavelength size optical spots or transmitted light having an intensity modulation along a propagation axis or in planes above the structure.

* * * * *

UNITED STATES PATENT AND TRADEMARK OFFICE
CERTIFICATE OF CORRECTION

PATENT NO. : 8,027,039 B2
APPLICATION NO. : 12/082824
DATED : September 27, 2011
INVENTOR(S) : Joseph R. Lakowicz, Mustafa H. Chowdhury and Chandran R. Sabanayagam Page 1 of 1

It is certified that error appears in the above-identified patent and that said Letters Patent is hereby corrected as shown below:

Col. 1, line 10 under Federal Funding Legend, "This work was supported by grants from the National Institutes of Health (RR-08119, EB-006521 and HG-002655). The U.S. Government has certain rights in this invention." should read --This invention was made with government support under Grant Numbers RR008119, EB006521 and HG002655 awarded by the National Institutes of Health. The government has certain rights in the invention--.

Signed and Sealed this
Nineteenth Day of June, 2012

David J. Kappos
*Director of the United States Patent and Trademark Office*